United States Patent [19]

Hayes

[11] Patent Number: 5,058,755
[45] Date of Patent: * Oct. 22, 1991

[54] TAMPER INDICATING CLOSURE HAVING RETAINING HOOP WITH RELIEF WINDOWS

[75] Inventor: Thomas H. Hayes, Lancaster, Ohio

[73] Assignee: Anchor Hocking Packaging Company, Lancaster, Ohio

[ * ] Notice: The portion of the term of this patent subsequent to Dec. 18, 2007 has been disclaimed.

[21] Appl. No.: 568,575

[22] Filed: Aug. 20, 1990

Related U.S. Application Data

[63] Continuation-in-part of Ser. No. 401,966, Sep. 1, 1989, Pat. No. 4,978,016.

[51] Int. Cl.⁵ .............................................. B65D 41/34
[52] U.S. Cl. .................................................... 215/252
[58] Field of Search ................................ 215/230, 252

[56] References Cited

U.S. PATENT DOCUMENTS

| Re. 32,879 | 2/1989 | Wright et al. |  |
|---|---|---|---|
| 4,478,343 | 10/1984 | Ostrowsky . |  |
| 4,506,795 | 3/1985 | Herr . |  |
| 4,546,892 | 10/1985 | Couput . |  |
| 4,550,844 | 11/1985 | Lininger | 215/252 |
| 4,592,475 | 6/1986 | Hannon et al. . |  |
| 4,595,110 | 6/1986 | Herr | 215/252 |
| 4,613,052 | 9/1986 | Gregory et al. . |  |
| 4,657,153 | 3/1987 | Hayes . |  |
| 4,694,969 | 9/1987 | Granat | 215/252 |
| 4,732,289 | 3/1988 | Granat et al. | 215/252 |
| 4,796,770 | 1/1989 | Begley . |  |
| 4,801,030 | 1/1989 | Barriac . |  |
| 4,807,771 | 2/1989 | Roy et al. | 215/252 |
| 4,813,561 | 3/1989 | Ochs . |  |
| 4,813,562 | 3/1989 | Begley . |  |
| 4,848,614 | 7/1989 | Czaszar | 215/252 |
| 4,875,594 | 10/1989 | Ochs | 215/252 |
| 4,895,266 | 1/1990 | Begley | 215/230 |

FOREIGN PATENT DOCUMENTS 2033350 11/1975 United Kingdom .

*Primary Examiner*—Stephen Marcus
*Assistant Examiner*—Vanessa M. Roberts
*Attorney, Agent, or Firm*—Wood, Herron & Evans

[57] ABSTRACT

A closure for a container has a tamper indicating band with a band retainer in the form of an apertured flap or hoop which is hinged to the lower edge of the band. A series of windows open through the retainer, extending toward but not to its distal edge. As the retainer is turned inside out from its as-molded position to its use position, its distal and/or hinged edges deform to relieve compression and permit the retainer to be inverted by direct downward pushing force. As a result of the deformation, the retainer in its use position may, depending on the number and size of windows, have an advantageous polygonal peripheral shape rather than a circular shape.

26 Claims, 3 Drawing Sheets

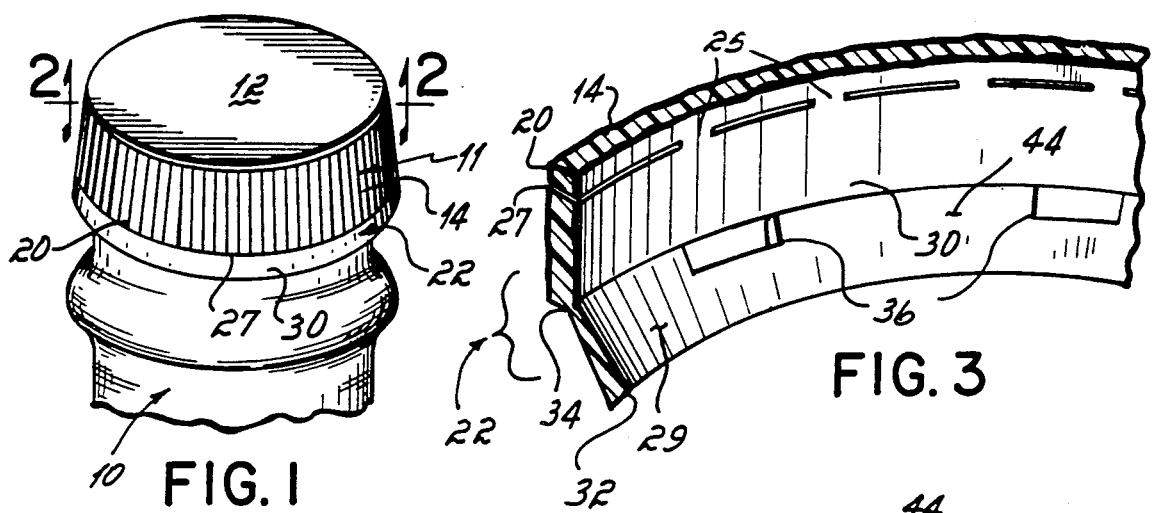
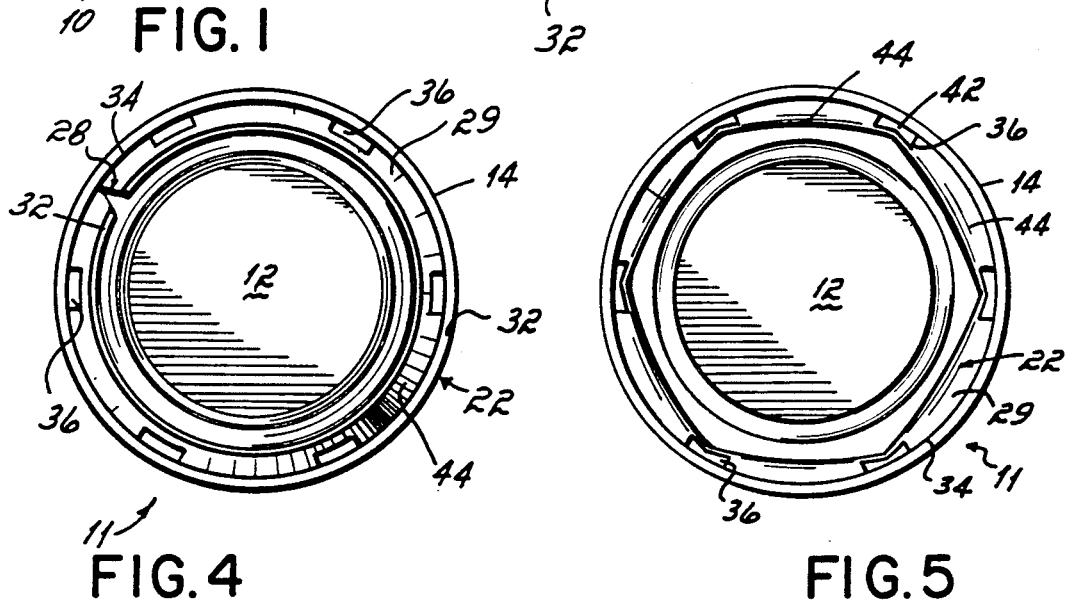
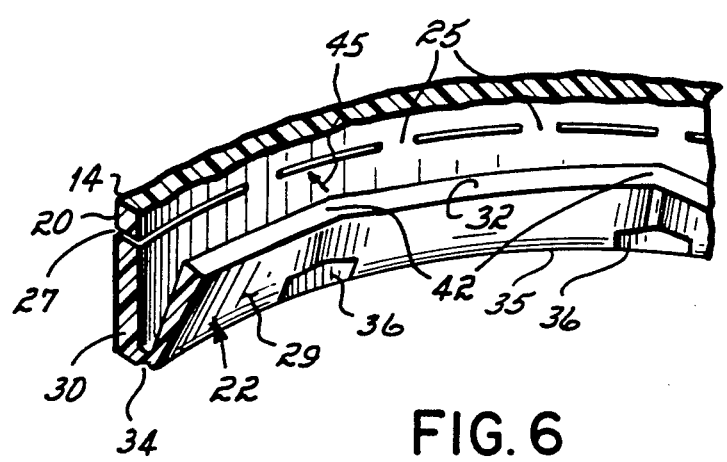

TAMPER INDICATING CLOSURE HAVING RETAINING HOOP WITH RELIEF WINDOWS

RELATED APPLICATIONS

This application is a continuation-in-part of my copending application Ser. No. 401,966, field Sept. 1,1989, now U.S. Pat. No. 4,978,016.

This invention relates to container closures of the type having a frangible tamper indicating band which, when broken, provides a visible indication that the container has been opened.

THE PROBLEM IN THE ART

Closures having tamper indicating bands typically include some type of band retaining means which engages the underside of a locking bead around the neck of the container. When the closure is opened for the first time, the "retainer" exerts a downward force on the band which causes the band to sever and separate from the upper part of the closure. A visible gap is thereupon opened between the band and the upper part of the closure, which shows that the container and/or closure has been at least partially opened. The retainer is often in the form of up turned tabs or "fishhooks" around the inside of the band.

In order to assure that the tamper indicating band breaks in the initial opening, it is of course critical that the retainer positively engage the locking bead on the container and be arrested by it, rather than sliding upwardly past the bead as the closure is removed. For this reason a relatively stiff and unflexible retainer is desirable. If the retainer is too pliable or flexible, it may collapse or fold down when it comes into engagement with the locking bead and thus not resist upward movement of the band, and thereby permit the closure to be removed without visibly affecting the tamper indicating band. However, molding processes usually require that the retainer be molded in a "down" position, in which the retainer is angled inwardly and downwardly from the top, and if the retainer is too stiff it resists being turned or folded from that initial "as molded" position, to its upturned, locking bead-engaging, use position.

In some instances, a closure can be applied to a container with the retainer in the down, as molded position; the retainer is automatically turned up or inverted to the use position as the closure is secured in place. In other cases, however, where the retainer is stiffer so as better to resist inadvertent downfolding on opening, a separate post-forming operation is used to turn it up after the closure has been molded but before the closure is applied to the container. The two needs are at cross purposes: the stiffer the retainer is, the more securely it engages the locking bead when the closure is unscrewed, but the more difficult it is to invert from the down, as made, position to the up, bead engaging, use position. If the retainer is so stiff that it must be turned up by applying point force progressively around its circumference at its inner edge, rate of production is slowed.

Thus there has been a need for a tamper-indicating closure having a retaining means which can be turned from a down, molded position, to an up, use position, at a rate consistent with high production speeds, but which is still stiff enough to insure that the band will break upon opening.

PRIOR ART

Ostrowsky U. S. Pat. No. 4,478,343 in FIG. 10 shows a closure having a tamper indicating band with retaining tabs that are separated by thin webs. Gaps are presented between spaced apart hinged segments to make the hinge more flexible. In that closure the tabs are circumferentially flexible and, when swung through a horizontal center position, the inside dimension of the retainer is reduced by circumferential overlap along its inner edge.

Kerr U.S. Pat. No. 4,506,795 shows a tamper evident closure having a large number of individual tabs, each upwardly bent to engage the underside of a bead on the container. The tabs are separated from one another.

Hannon U.S. Pat No. 4,592,475 shows another closure having circumferentially spaced tabs.

Gregory et.al. U.S. Pat. No. 4,613,052 shows a tamper indicating band which is generally cylindrical, connected to the lower end of a tamper indicating band by frangible bridges. The entire band is folded inwardly to a bead-engaging position by a separate post-forming operation, prior to application of the cap to the container.

Hayes U.S. Pat. No. 4,657,153 shows a closure having a plurality of spaced, upturned locking tabs for engaging beneath the bead of a container. In FIG. 7A of that patent, hinges 13 at the base of tabs 10 are separated by intermediate slots 14. Each window is several times longer than the respective hinge.

Begley U.S. Pat. No. 4,796,770 shows a closure having a retaining means in the form of a plurality of hinged flaps which are separated circumferentially by notches to function independently.

In Wright Reissue U.S. Pat. No. 32,879, separately projecting stops are hinged along the lower edge of the tamper indicating band and are swung upwardly and inwardly to project into and through relief windows above the band which provide clearance for the stops to be cammed outwardly when the cap is applied.

BRIEF SUMMARY OF THE INVENTION

If the retainer is in the form of a continuous, inwardly angulated unapertured conical hoop below the tamper indicating band, so-called "hoop strength" generally makes it difficult to turn the retainer inside out as is required to invert it from the down, as molded position, to the up, bead-engaging position. In accordance with this invention, the retainer is in the form of a flap or hoop which is essentially continuous around its distal (inner) edge, hinged along its outer edge to the band, and having a series of "relief windows" or deformation ports through it. (As used herein in reference to the distal edge of the retainer, "essentially continuous" means that the retainer is unbroken or has only a single gap in its distal edge. A break such as a transverse gap in the distal edge makes it easier to press the retainer over the locking bead of a container, in comparison to the retainer of an otherwise similar closure having an unbroken edge. It is however far more difficult to remove a closure having no split or only a single split than a closure with a plurality of splits around its distal edge.)

The relief windows permit the hinged and/or distal edges of the retainer to deform in an advantageous manner, under the compression which arises during inversion. When the retainer is being folded to its use or up position, it deforms to relieve compression as it crosses center. The deformation may be in the plane of the retainer and away from the hinge line at the lower edge of the band; or it may appear as an arc which is perpendicular to the plane of the retainer; or the "mullions" between the windows may buckle adjacent the hinge line in a direction transverse to the plane of the retainer. This retainer structure is preferable to the circumferential overlapping of the distal edge of a retainer as taught by Ostrowsky U.S. Pat. No. 4,478,343 which has thin webs between foldable tabs. Such thin webs are difficult to form consistently on a production basis.

Surprisingly, the provision of the windows affords a number of unexpected advantages. In comparison to an unapertured retainer, they enable the retainer to be folded up more easily and quickly, prior to the time the closure is secured to the container. The windows more effectively relieve the compression stress as the retainer is turned from the down position, through an intermediate inturned position in which its distal edge is in compression, to its up position. The windows also provide a better balance between the force required to secure the closure on the container and the circumferential shearing force required to provide the indication of tampering, by increasing the latter. Preferably the windows have substantial "height" in comparison to the height (transverse dimension) of the retainer; optimally, they should extend at least ⅓ of the distance from the lower edge of the band (i.e., the hinge edge) to the distal (inner) edge of the retainer.

The retainer of this invention can be relatively stiff, and indeed is preferably thicker at its inner (distal) edge than at its outer (hinge) edge. If the windows are narrow in relation to the circumferential dimension of the hinges between them, then the retainer (as viewed in plan in the use position) assumes a distinctly polygonal shape in which the portions inward of the hinges press more tightly against that container neck than the portions inward of the windows. This improves the "grip" of the retainer on the container and hence improves the band severing action when the closure is turned to open it.

A further advantage is that in use the entire inner edge of the retainer engages or lies very close to the container neck; preferably there are no significant gaps between the retainer edge and the container wall. This effectively seals the retainer against dirt and infestation which otherwise might enter from below.

Yet another advantage is that, if the windows are relatively small in area, they do not permit the entrance of an insect into the space between the band and the container, above the retainer. Indeed, the size of the windows as formed can be reduced when the retainer is folded up, because the retainer deforms into the open window area. This makes possible compliance with recommendations against any gap larger than 0.015" in the closure.

Still further, the relief windows act as drain ports for wash water directed downwardly through wash slots above and/or upwardly from a point below the retainer. Wash water so directed can flow over the container threads or lugs to wash them, and then drain through the windows at the bottom of the retainer.

DESCRIPTION OF THE DRAWINGS

The structure which provides these advantages can best be further described and understood by reference to the accompanying drawings, in which:

FIG. 1 is a perspective view of the top part of a container having a closure in accordance with a preferred form of this invention;

FIG. 3 is an enlarged fragmentary perspective view of the tamper-indicating band and retainer of the closure of FIG. 2, showing the retainer in its down, as-formed position;

FIG. 4 is a bottom plan view of the closure showing the retainer in its as-formed position;

FIG. 5 is a bottom plan view similar to FIG. 4 but shows the retainer after it has been folded to its up or use position, for engaging the container locking bead;

FIG. 6 is a fragmentary perspective view similar to FIG. 3 but shows the deformation of the retainer after it has been folded to its use position;

DETAILED DESCRIPTION

Figure 2:
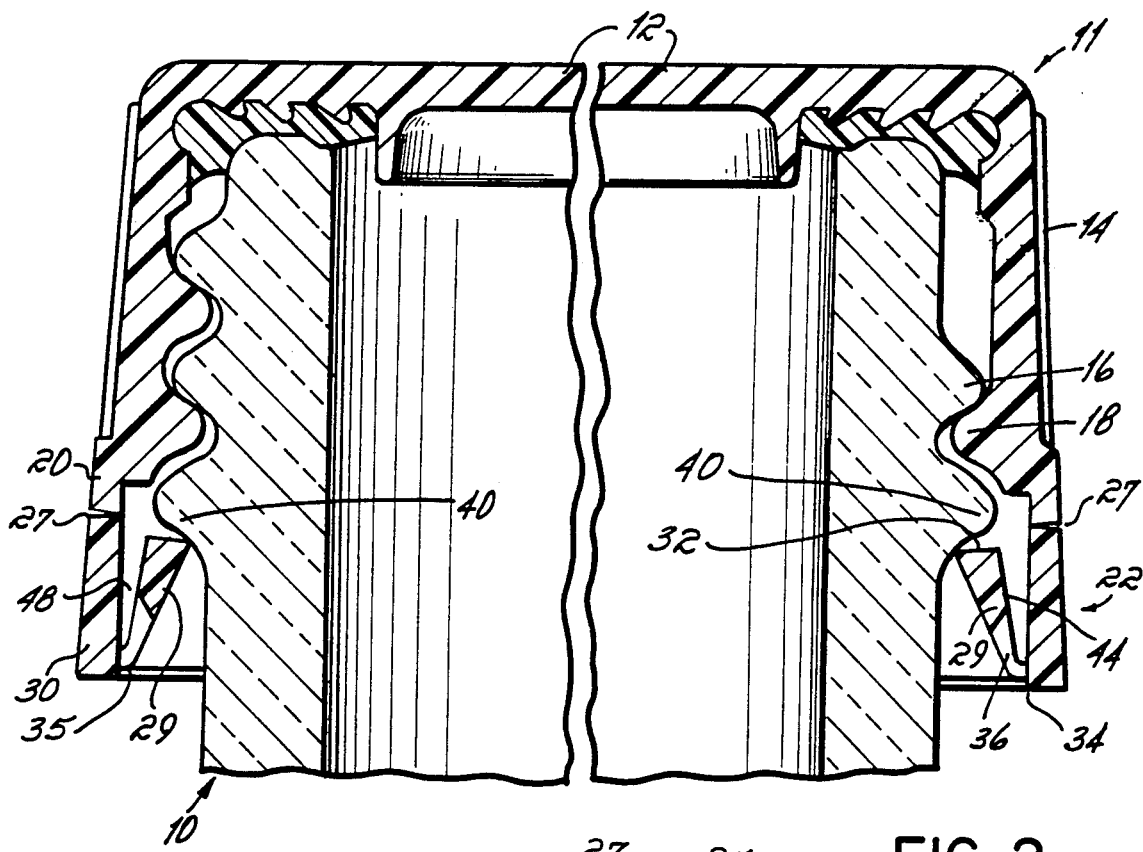
FIG. 2 (on a separate sheet from FIG. 1) is an enlarged axial cross-section taken on line 2—2 of FIG. 1.

In the drawings a container 10 is shown having a closure 11 applied to its top opening. For purposes of illustration closure 11 is shown as a one-piece plastic molding having an integral top 12 and skirt 14. However, it is contemplated that the principles of the invention are also useful with composite closures in which a metal or composite disk is inserted into an annular plastic shell. As used herein, the term "top" in reference to the closure includes both integral tops and separate tops; the shell or skirt 14 may be integral with or separate from the top.

The container 10 shown for purposes of illustration has closure securing means in the form of external threads 16 around its neck, which engage internal threads 18 on the inside of the closure 11. The invention is useful not only on threaded containers but also on containers having interrupted canted lugs or a snap bead.

Around the lower edge 20 of closure skirt 14 there is attached a frangible or severable tamper-indicating band indicated generally by 22. This band 22 is in the form of an annulus and is formed integrally with closure skirt 14, to which it is connected by a series of spaced frangible bridges 25 (see FIG. 3). The bridges 25 may be interruptions in a circumferential score line or partial cut 27 around the outside of the closure. The score line 27 severs band 22 from the remainder of the closure except at these bridges. Bridges 25 thus act as the "weak link" along which the tamper-indicating band 22 severs or tears from the upper part of the closure. (In the embodiment shown, the band 22 separates entirely from the rest of the closure when the bridges 25 rupture, and remains on the container thereafter. It is alternatively contemplated that band 22 may remain attached to the closure by a flexible connector after the bridges 25 have been broken, so that the band is removed with the closure rather than remaining on the container.)

As best shown in FIGS. 2 and 3, tamper-indicating band 20 includes a band retaining means or retainer 29 preferably in the form of a continuous hoop or flap connected integrally along the lower edge 30 of band 22. (The flap may have a "split," gap, or division as shown at 28 in FIG. 4 in its inner or distal edge 32 at one point around its circumference, but this is not preferred.) Retainer 29 is molded in a first position in which it is angulated downwardly and inwardly from skirt 14 (see FIG. 3), i.e., away from top 12. As best shown in FIG. 2, the retainer is preferably tapered so that it is thicker at its inner edge 32 than at its hinge edge 35, to provide greater stiffness.

Retainer 29 is hingedly connected to tamper-indicating band 22 by a series of spaced flexible integral hinges 34, each of which is preferably of sufficient angular extent to act as an arcuate joint when the retainer is folded about hinge edge 35, and thereby provide an over-center hinging action. The hinges 34 are separated or spaced from one another by open relief windows or ports 36, as shown in FIG. 3. The windows 36 are preferably rectangular with outer edges which are colinear with the hinges 34 along edge 35. In the preferred embodiment shown, the windows 36 have a substantial height (dimension in the direction toward the distal edge): they extend at least ⅓ of the distance from the hinge edge to the distal edge, that is, the unapertured portion above the windows is less than ⅔ the height of the flap. However, in any case it is important that windows 36 do not open to distal edge 32, that is, distal edge 32 extends unbroken across both the windows 36 and the hinges, except possibly for a split as at 28. The windows 36 are open areas, not merely thin areas, preferably beginning at the hinge line 35 and extending toward distal edge 32. The closer the windows 36 extend to edge 32, i.e., the more nearly they sever the retainer, the less the hoop strength. If the windows 36 are too large in a given closure and material, the retainer 29 may be so weak as to slide past a locking bead 40 and not sever the band at the score line 27. In this embodiment the "mullions" 44 between the windows are wider, in circumferential extent, than the windows; depending on closure size, they may be substantially wider (e.g., about 1.5-6x) than the windows 36. The circumferential width of the windows 36 is preferably at least twice their height, depending upon the diameter of the cap 11. As shown in FIG. 2, the distal edges of the windows may be angulated downward to facilitate stripping from the mold.

As already indicated, these windows 36 provide a surprising effect when the retainer 29 is inverted from its as-formed position (FIG. 3) to the use position shown in FIGS. 2 and 6, in which the inner edge 32 is positioned to hold beneath the locking band 40 of container 10. Because the retainer 29 is formed as a truncated cone with a circular distal edge 32, it might be thought that after folding to the use position of FIG. 2, it would resume a circular configuration, the two positions being symmetrical about a plane through hinge line 35. However, that does not occur. On the contrary, in use position the retainer takes on a generally polygonal shape, as seen in plan in FIG. 5. The polygonal shape is most pronounced in closures with relatively few and small windows.

More particularly, I have found that the provision of the relief ports 36 permits the retainer to deform and thereby relieve the compression that arises along the distal edge 32 as the retainer is inverted from the down position to the up position. In this embodiment the distal edge 32 deforms in the radial direction, forming arcs or peaks 42 extending outwardly (perpendicularly to the plane of the retainer) in the regions across the windows (between the hinges). When the retainer 29 has been folded to the up position of FIG. 2, it surprisingly assumes the generally polygonal configuration shown in FIG. 5, rather than a circular shape; the portions of the retainer between the hinges (i.e., across the windows 36) deform radially outwardly and thereby reduce the distance between the band and the retainer distal edge 32, with the hinge areas or mullions 44 between the windows 36 lying closer to the center axis of the closure. This shape enables the retainer 29 better to grip the container sidewall beneath locking band 40, regardless of manufacturing tolerances in the dimensions of the container 10 and the closure 11, and more certainly to shear the bridges 25 and cause the tamper-indicating band to separate.

Because the retainer 29 normally conforms relatively tightly to the container around its entire periphery, it acts as a seal against insect infestation. The fit can be so close that no opening between the distal edge 32 of the retainer and the container wall exceeds the maximum recommended limit of 0.015". The windows 36 themselves are partially closed by the deformation of the retainer 29, and the gap above them may itself be less than 0.015". Moreover, the distance from the line of contact of retainer distal edge 32 with the container, to the bottom 34 of the closure, may be ¼" or less, in compliance with federal AFSIS regulations. This avoids possible intake of dirt or contamination into the container when the vacuum is broken.

Apart from relieving hoop strength as the retainer is inverted to the use position, the apertures also facilitate water washing of the interthread space between the closure 11 and the container 10. For example, a water wash spray directed downwardly through water slots above it in the closure 11, and/or upwardly toward distal edge 32, can flow between the lugs or interrupted threads to wash them, then drain downwardly into the V-shaped pocket 48 carrying any entrained food particles and flow out through the windows 36.

In the embodiment shown in FIGS. 1-6 and described above, the windows 36 are relatively few and narrow in relation to the width of the hinge mullions 44 between them. As already noted, that embodiment provides a relatively stiff retainer. For some applications so much stiffness is not needed and the proportion of window area can be larger. This also reduces the area of the pockets 48 between the retainer and the band and provides a larger open area for better water washing and drainage. Two embodiments having progressively larger windows are shown respectively in FIGS. 7 and 8, and 9 and 10.

Figure 7:
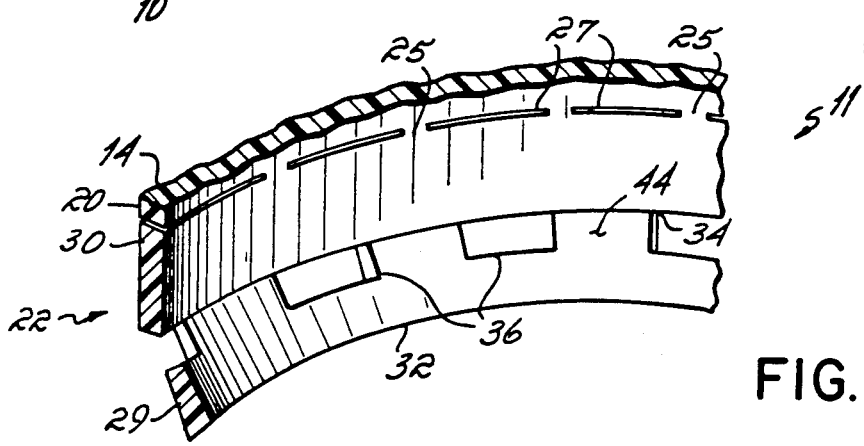
FIG. 7 is an enlarged fragmentary perspective view similar to FIG. 3 but shows a closure having a retainer with more and larger windows, in accordance with a modified form of the invention.
Figure 8:
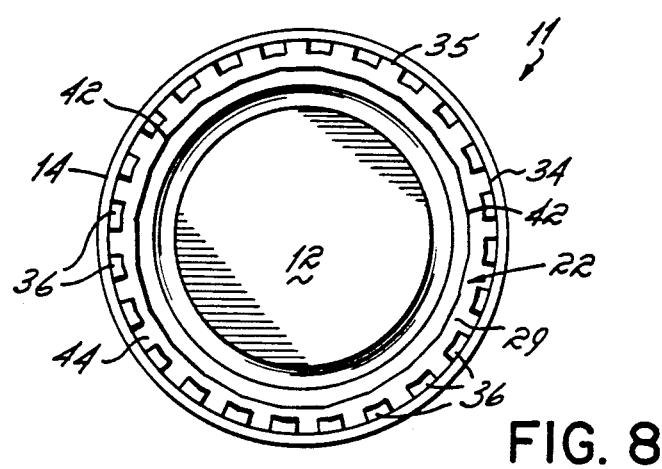
FIG. 8 is a bottom plan view of the closure of FIG. 7, with the retainer in its up position.

In the embodiment of FIGS. 7 and 8, the windows 36 are about equal in width (circumferential dimension) to the hinge mullions 44 between them. In this embodiment, as in the first, the areas above the windows 36 deform outwardly radially toward band 22, as indicated by arrow 45 in FIGS. 6 and 12, but the deformation of each is less because there are more windows. In the up position, the retainer still forms a polygon but the peaks 42 are much less pronounced (see FIG. 8). They can for example be felt as nonuniformities by running a finger around the inner edge of the hoop 29 in the up position.

Figure 9:
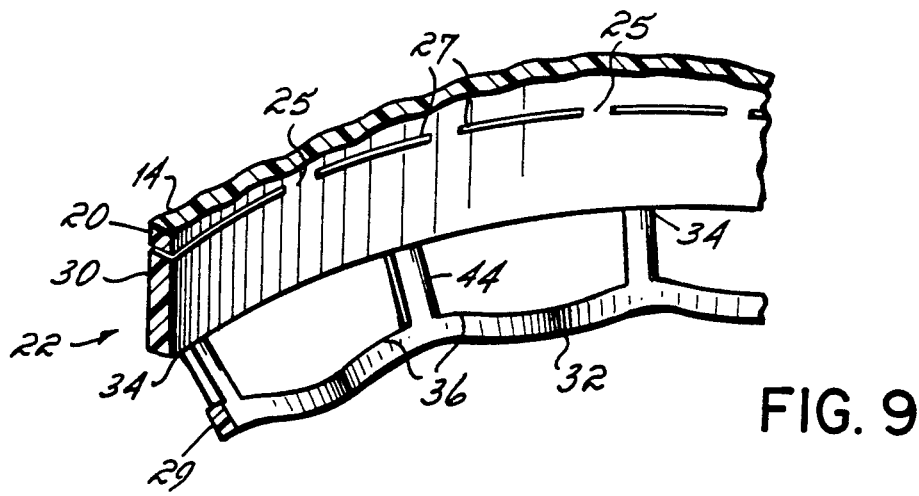
FIG. 9 is a view similar to FIGS. 3 and 7 but shows a closure having a retainer with still larger windows, in accordance with another modified form of the invention.
Figure 10:
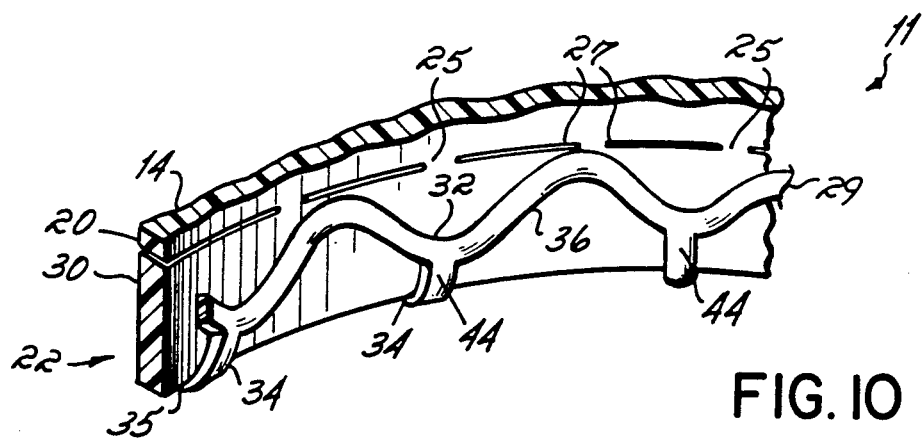
FIG. 10 is a fragmentary perspective view of the closure of FIG. 9, with the retainer in its up position.

If the windows 36 are of still greater width and/or height, i.e., wider than the hinges, as in the embodiment of FIGS. 9 and 10, the retainer 29 still distorts along its inner edge, across the windows, to relieve compression stress, but in a different way. Here the distortion is in a different direction than the transverse distortion shown in FIGS. 6 and 8, and is in the plane of the original (underformed) band. In this embodiment the deformation is away from the hinge edge 35; as indicated by arrow 55 it is parallel to mullions 44, rather than radial, and distal edge 32 assumes a "wavy," undulating or up and down configuration (see FIG. 10). In this embodiment the circumferentially narrow hinges may no longer function as arcuate hinges; they bend along essentially straight short lines, not arcs. This configuration is useful for small diameter closures; moreover, the wavy edge may interfit with corresponding ribs formed on the container finish to insure quicker band breakage upon turning.

Figure 11:
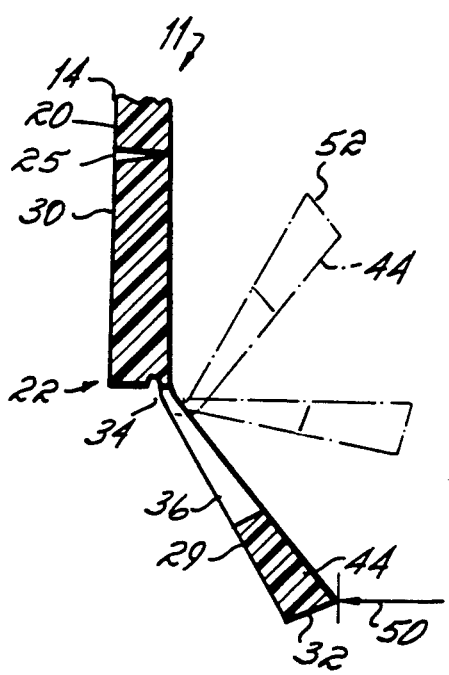
FIG. 11 is an enlarged fragmentary vertical section diagrammatically illustrating a retainer being inverted from the down to the up position.
Figure 12:
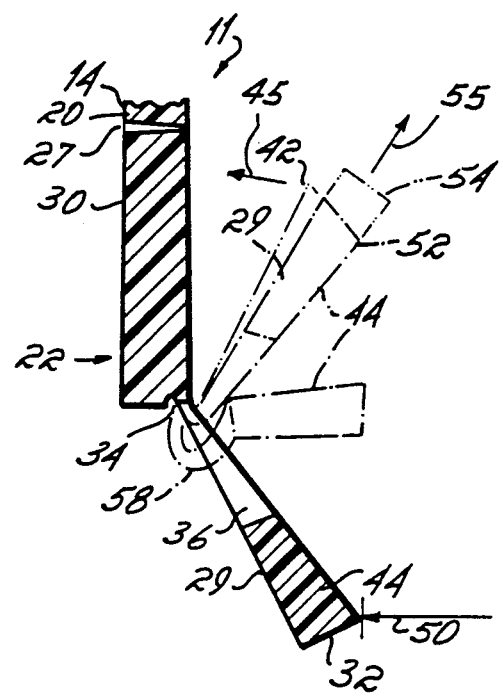
FIG. 12 is a section similar to FIG. 11 but shows the various ways in which the hoop may deform upon inversion.

The various types of retainer deformation are further illustrated in FIGS. 11 and 12. In the down position, the inside diameter of the retainer, measured at its innermost edge, is designated by 50. In the up position (phantom line 52), it has approximately the same inside diameter 50. As the retainer 29 moves through the over-center (horizontal) position, half way between the down and up positions, its inside diameter wants to remain the same, but the retainer must deform for this to be possible thereby placing distal edge 32 in compression. Depending on relative window size and other factors, the distal edge will deform upwardly and inwardly in the plane of retainer 29 as at 54, or perpendicular to its plane, as at 42; or the hinge mullions can buckle from the plane, as at 58 in FIG. 12. In each case the deformation is transverse to the original (undeformed) arcs of edges 32 and 35. The deformation occurs as the retainer crosses center but tends to remain after the retainer has reached the up position. In each case the accommodation of compression stress enables the retainer to be inverted from down to up by applying direct axial force simultaneously around the entire distal edge. The retainer need not be turned up by applying spot force progressively around the edge to "roll up" the retainer. This saves substantial time on a production line.

Having described the invention, what is claimed is:

1. A tamper indicating closure for use in sealing a container of the type having closure securing means and a locking bead below the securing means,
   said closure comprising,
   a top,
   a skirt depending from said top,
   means on said skirt for engaging the closure securing means of the container,
   a tamper indicating band frangibly attached to and depending from said skirt,
   a retainer around a lower edge of said band for engaging the container below the locking bead thereof,
   a series of spaced integral hinges connecting said retainer to said band along said lower edge of said band,
   said retainer having an essentially continuous distal edge,
   a plurality of relief windows in said retainer, said windows being between said hangers and commencing adjacent said lower edge, said windows extending toward but not to said distal edge,
   said retainer being movable from a first position in which it projects angularly inward in a direction away from said top, to a second position in which it projects angularly inward and toward said top, for engagement with the locking bead of the container,
   said windows extending at least one-third the distance between said lower edge and said distal edge,
   the portions of said retainer which extend across or between said windows being sufficiently narrow so that they can deform in a direction which is inwardly, outwardly, or in the plane of the retainer, thereby to relieve compression stress as said retainer is being moved from said first position to said second position.

2. A tamper indicating closure for use in sealing a container of the type having closure securing means and a locking bead below the securing means,
   said closure comprising,
   a top,
   a skirt depending from said top,
   means on said skirt for engaging the closure securing means of the container,
   a tamper indicating band frangibly attached to and depending from said shirt,
   a retainer around a lower edge of said band for engaging the container below the locking bead thereof,
   a series of spaced integral hinges connecting said retainer to said band along said lower edge of said band,
   said retainer having an essentially continuous distal edge,
   a plurality of relief windows in said retainer, said windows being between said hinges and commencing adjacent said lower edge, said windows extending toward but not to said distal edge,
   said retainer being movable from a first position in which it projects angularly inward in a direction away from said top, to a second position in which it projects angularly inward and toward said top, for engagement with the locking bead of the container,
   said retainer deforming along said distal edge above said windows or adjacent the lower edge of said band between said windows to relieve compression stress as said retainer is being moved from said first position to said second position,
   the portions of said retainer which extend across the respective windows being deformed, when said retainer is in said second position, in direction radially outward from said retainer, toward said band.

3. A tamper indicating closure for use in sealing a container of the type having closure securing means and a locking bead below the securing means,
   said closure comprising,
   a top,
   a skirt depending from said top,
   means on said skirt for engaging the closure securing means of the container,
   a tamper indicating band frangibly attached to and depending from said skirt,
   a retainer around a lower edge of said band for engaging the container below the locking bead thereof,
   a series of spaced integral hinges connecting said retainer to said band along said lower edge of said band, said retainer having an essentially continuous distal edge, a plurality of relief windows in said retainer, said windows being between said hinges and commencing adjacent said lower edge, said windows extending toward but not to said distal edge, said retainer being movable from a first position in which it projects angularly inward in a direction away from said top, to a second position in which it projects angularly inward and toward said top, for engagement with the locking bead of the container, said retainer deforming along said distal edge above said windows or adjacent the lower edge of said band between said windows to relieve compression stress as said retainer is being moved from said first position to said second position, portions of said retainer which extend across the respective windows being deformed, when said retainer is in said second position, upwardly and away from said lower edge of said band, said deformation appearing as undulations in a direction parallel to the plane of said retainer.

4. A tamper indicating closure for use in sealing a container of the type having closure securing means and a locking bead below the securing means, said closure comprising, a top, a skirt depending from said top, means on said skirt for engaging the closure securing means of the container, a tamper indicating band frangibly attached to and depending from said skirt, a retainer around a lower edge of said band for engaging the container below the locking bead thereof, a series of spaced integral hinges connecting said retainer to said band along said lower edge of said band, said retainer having an essentially continuous distal edge, a plurality of relief windows in said retainer, said windows being between said hinges and commencing adjacent said lower edge, said windows extending toward but not to said distal edge, said retainer being movable from a first position in which it projects angularly inward in a direction away from said top, to a second position in which it projects angularly inward and toward said top, for engagement with the locking bead of the container, said retainer deforming along said distal edge above said windows or adjacent the lower edge of said band between said windows to relieve compression stress as said retainer is being moved from said first position to said second position, said retainer being deformed, when in said second position, by inward buckling of portions thereof between said windows and adjacent said hinges.

5. The closure of claim 1 wherein said windows extend at least ½ the distance between said lower edge and said distal edge.

6. The closure of claim 1 wherein the circumferential dimension of the hinges is less than the circumferential dimension of the windows.

7. The closure of claim 1 wherein said hinges fold along straight lines.

8. The closure of claim 1 wherein said windows have outer edges which are colinear with said hinges.

9. A tamper indicating closure for use in sealing a container of the type having closure securing means and a locking bead below the securing means, said closure comprising, a top, a skirt depending from said top, means on said skirt for engaging the closure securing means of the container, a retainer around a lower edge of said band for engaging the container below the locking bead thereof, a series of spaced integral hinges connecting said retainer to said band along said lower edge of said band, said retainer having an essentially continuous distal edge, a plurality of relief windows in said retainer, said windows being between said hinges and commencing adjacent said lower edge, said windows extending toward but not to said distal edge, said retainer being movable from a first position in which it projects angularly inward in a direction away from said top, to a second position in which it projects angularly inward and toward said top, for engagement with the locking bed of the container, said retainer deforming along said distal edge above said windows or adjacent the lower edge of said band between said windows to relieve compression stress as said retainer is being moved from said first position to said second position, said retainer in said first position being in the form of a truncated conical hoop having a circular distal edge, and in said second position having a distal edge of polygonal shape wherein portions of said edge which are between said windows lie radially inward of portions thereof which are across said windows.

10. The closure of claim 9 wherein said distal edge is set by said deformation when said retainer is moved from said first position to said second position.

11. The closure of claim 1 wherein said closure is molded with said retainer in said first position.

12. The closure of claim 1 wherein the width of the windows is greater than their height.

13. The closure of claim 1 wherein said retainer has a single gap along said distal edge.

14. The closure of claim 1 wherein said closure is an integral molding of plastic and has a unitary top.

15. A sealed package comprising a container and a closure secured thereon, said container being of the type having closure securing means and a locking bead below the securing means, said closure comprising, a top, a skirt depending from said top, means on said skirt for engaging the closure securing means of the container, a tamper indicating band frangibly attached to and depending from said skirt, a retainer around a lower edge of said band for engaging the container below the locking bead thereof, a series of spaced integral hinges connecting said retainer to said band along said lower edge of said band, said retainer having an essentially continuous distal edge, a plurality of relief windows in said retainer, said windows being between said hinges and commencing adjacent said lower edge, said windows extending toward but not to said distal edge, said retainer being movable from a first position in which it projects angularly inward in a direction away from said top, to a second position in which it projects angularly inward and toward said top, for engagement with the locking bead of a container, said windows extending at least one-third the distance between said lower edge and said distal edge, the portions of said retainer which extend across or between said windows being sufficiently narrow that they can deform in a direction which is inwardly, outwardly, or in the plane of the retainer, thereby to relieve compression stress as said retainer is being moved from said first position to said second position.

16. A sealed package comprising a container and a closure secured thereon, said container being of the type having closure securing means and a locking bead below the securing means, said closure comprising, a top, a skirt depending from said top, 'means on said skirt for engaging the closure securing means of the container, a tamper indicating band frangibly attached to and depending from said skirt, a retainer around a lower edge of said band for engaging the container below the locking bead thereof, a series of spaced integral hinges connecting said retainer to said band along said lower edge of said band, said retainer having an essentially continuous distal edge, a plurality of relief windows in said retainer, said windows being between said hinges and commencing adjacent said lower edge, said windows extending toward but not to said distal edge, said retainer being movable from a first position in which it projects angularly inward in a direction away from said top, to a second position in which it projects angularly inward and toward said top, for engagement with the locking bead of a container, said retainer deforming in a direction along said distal edge above said windows or adjacent the lower edge of said band between said windows, to relieve compression stress as said retainer is being moved from said first position to said second position, the portions of said retainer between said windows binding against the container more tightly than portions of said retainer across said windows and thereby facilitating release of said tamper indicating band from said closure when the closure is rotated to open the package.

17. The package of claim 15 wherein said distal edge is continuous around the entire circumference thereof.

18. The package of claim 15 wherein said distal edge is continuous around the entire circumference thereof, except for a single narrow gap in said distal edge.

19. The package of claim 15 wherein said retainer is thickest along said distal edge.

20. The package of claim 15 wherein said windows extend ⅓ the distance between said lower edge to said distal edge.

21. The package of claim 15 wherein said windows have outer edges which are colinear with said hinges.

22. The package of claim 15 wherein the circumferential dimension of said hinges is greater than the circumferential dimension of said windows.

23. The package of claim 15 wherein said hinges are in the range of 1.5–6x the width of said windows.

24. The package of claim 15 wherein the width of said windows is at least twice their height.

25. The package of claim 15 wherein said closure is an integral molding of plastic and said top is unitary with it.

26. The package of claim 15 wherein said means of the closure for engaging the closure securing means of the container is at least one screw thread.

* * * * *

UNITED STATES PATENT AND TRADEMARK OFFICE
CERTIFICATE OF CORRECTION

PATENT NO.  :   5,058,755
DATED       :   Oct. 22, 1991
INVENTOR(S) :   Thomas H. Hayes It is certified that error appears in the above-identified patent and that said Letters Patent is hereby corrected as shown below:

Col. 1, line 7, "field" should be --filed--

Col. 8, line 27, "shirt" should be --skirt--

Col. 10, line 8, after "container," insert --a tamper indicating band frangibly attached to and depending from said skirt,--

Col. 10, line 24, "bed" should be --bead--

Col. 11, line 24, after "top," delete --'--

Col. 12, line 24, after "extend" insert --at least --

Signed and Sealed this

Third Day of August, 1993

Attest:

MICHAEL K. KIRK

*Attesting Officer*    *Acting Commissioner of Patents and Trademarks*